US008664140B2

(12) United States Patent
Schmitz et al.

(10) Patent No.: US 8,664,140 B2
(45) Date of Patent: Mar. 4, 2014

(54) CATALYST SYSTEM FOR OLEFIN POLYMERIZATION, ITS PRODUCTION AND USE

(75) Inventors: Harald Schmitz, Weinheim (DE); Fabiana Fantinel, Frankfurt (DE); Jürgen Hilz, Hofheim (DE); Shahram Mihan, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 22 days.

(21) Appl. No.: 13/133,660

(22) PCT Filed: Dec. 12, 2009

(86) PCT No.: PCT/EP2009/008911
§ 371 (c)(1),
(2), (4) Date: Aug. 17, 2011

(87) PCT Pub. No.: WO2010/069527
PCT Pub. Date: Jun. 24, 2010

(65) Prior Publication Data
US 2011/0294969 A1   Dec. 1, 2011

Related U.S. Application Data

(60) Provisional application No. 61/207,782, filed on Feb. 17, 2009.

(30) Foreign Application Priority Data

Dec. 17, 2008 (EP) .................................. 08021878

(51) Int. Cl.
| B01J 31/22 | (2006.01) |
| C08F 4/606 | (2006.01) |
| C08F 4/6192 | (2006.01) |
| C08F 4/646 | (2006.01) |
| C08F 4/6592 | (2006.01) |

(52) U.S. Cl.
USPC ........... 502/113; 502/103; 502/104; 502/152; 502/167; 526/113; 526/114; 526/160; 526/161; 526/165; 526/943

(58) Field of Classification Search
USPC .......... 502/103, 104, 113, 152, 167; 526/113, 526/114, 160, 165, 943, 161
See application file for complete search history.

(56) References Cited

U.S. PATENT DOCUMENTS

| 3,242,150 | A | 3/1966 | Scoggin |
| 3,248,179 | A | 4/1966 | Norwood |
| 6,417,302 | B1 | 7/2002 | Bohnen |
| 6,465,386 | B1 * | 10/2002 | Maddox et al. ............... 502/155 |
| 6,589,905 | B1 | 7/2003 | Fischer et al. |
| 2005/0159300 | A1 | 7/2005 | Jensen |

FOREIGN PATENT DOCUMENTS

| CA | 2262493 | 9/1998 |
| EP | 1041089 | 10/2000 |
| EP | 1300423 | 4/2003 |
| WO | WO-9600243 | 1/1996 |
| WO | WO-9728170 | 8/1997 |
| WO | WO-9822486 | 5/1998 |
| WO | WO-9840419 | 9/1998 |
| WO | WO-9906414 | 2/1999 |
| WO | WO-9946302 | 9/1999 |
| WO | WO-0005277 | 2/2000 |
| WO | WO-0031090 | 6/2000 |
| WO | WO-2009/043156 | 4/2009 |

OTHER PUBLICATIONS

Chen, Yaofeng "Halogen-Substituted 2,6-Bis(imino)pyridyl Iron and Cobalt Complexes: Highly Active Catalysts for Polymerization and Oligomerization of Ethylene", Organometallics, 2003, 22 2003 , 4312-4321.
Ittel, Steven D. "Late-Metal Catalysts for Ethylene Homo- and Copolymerization", Chem. Rev. 2000, 100 2000 , 1169-1203.
Wiesenfeldt, Helga "ansa-Metallocene derivatives; XVII. Racemic and meso diastereomers of group IV metallocene derivatives with symmetrically substituted dimethylsilanediyl-bridged ligand frameworks. Crystal structure of R,S-Me2SI(3-1-Bu-5-MeC5H2)2ZrCl2", Journal of Organometallic Chemistry, 369 Elsevier Sequoia S.A., Lausanne—Printed in the Netherlands 1989 , 359-370.
Fieser, Louis "Textbook of Organic Chemistry, Third Revised Edition", Verlag Chemie-GmbH, Weinheim/Bergstr. 1957 1957 , 10 pages.
Strauss, Steven H. , "The Search for Larger and More Weakly Coordinating Anions", Chem. Rev. vol. 93(3) 1993 , 927-942.

* cited by examiner

Primary Examiner — Caixia Lu

(57) ABSTRACT

Process for supportation of a catalyst system comprising at least two different active catalyst components on a support wherein
in an earlier supportation step a first active catalyst component is applied to the support at a first predetermined temperature and
in a later supportation step a second active catalyst component is applied to the support at a temperature which is at least 20° C. lower than the first predetermined temperature.

10 Claims, No Drawings

CATALYST SYSTEM FOR OLEFIN POLYMERIZATION, ITS PRODUCTION AND USE

This application is the U.S. national phase of International Application PCT/EP2009/008911, filed Dec. 12, 2009, claiming priority to European Patent Application 08021878.7 filed Dec. 17, 2008, and the benefit under 35 U.S.C. 119(e) of U.S. Provisional Application No. 61/207,782, filed Feb. 17, 2009; the disclosures of International Application PCT/EP2009/008911, European Patent Application 08021878.7 and U.S. Provisional Application No. 61/207,782, each as filed, are incorporated herein by reference.

The present invention process for preparing a catalyst system comprising at least two different active catalyst components on a support, the process comprising the steps
A) activation of a first active catalyst component at a first temperature, and
B) activation of a second active catalyst component at a second temperature which is at least 15° C. lower than the first temperature.

In addition, the invention relates to the catalyst systems obtained in this way, the use of the catalyst systems for the polymerization or copolymerization of olefins, and a process for olefin polymerizations, carried out in the presence of the catalyst system.

In the last decade catalyst systems had been developed which are so called hybrid catalyst systems having at least two active catalyst components. A broadening of the molecular weight up to bimodal or multimodal products can be achieved in this way. The catalyst systems are, for example, combinations of two metallocenes, a metallocene and a Ziegler catalyst or a metallocene and a chromium catalyst, metallocene and iron catalyst, Ziegler and iron catalyst, etc. The different catalyst components are usually applied sequentially to the support material. The catalyst systems obtained in this way often have a low activity and/or cannot easily be metered into the polymerization reactor since the catalyst sticks to the walls of the metering apparatus and does not flow down readily.

It is therefore an object of the invention to provide a catalyst system which displays a high catalyst activity when used in polymerization processes and can readily be metered into the polymerization reactor. In addition, the catalyst system should be able to be produced simply and inexpensively.

We have accordingly found a process for producing a catalyst system, comprising the steps
A) activation of a first active catalyst component at a first temperature, and
B) activation of a second active catalyst component at a second temperature which is at least 15° C. lower than the first temperature.

Furthermore, we have found the catalyst system prepared by the method and the use of the catalyst system for the polymerization or copolymerization of olefins.

Possible active catalyst components are any compounds active as a catalyst in the polymerization of α-olefins. Examples of these active catalyst compounds are transition metal compounds of groups 3 to 12 of the Periodic Table or the lanthanides which contain organic groups which are active in olefin polymerization after reaction with a so-called cocatalyst or activating compound. The active catalyst compounds are usually compounds in which at least one monodentate or polydentate ligand is bound via a sigma or pi bond to the central metal atom.

The process is especially suited for the preparation of a supported hybrid catalyst system which comprises an early transition metal compound and a late transition metal compound which Especially preferred is the preparation of a catalyst system comprising a metallocene, especially preferred a hafnocene or zirconocene, as an early transiiton metal complex and iron containing late transition metal complex, especially preferred an iron complex bearing a tridentate ligand. A large number of examples for late transition metal complexes which are suitable for olefin polymerization are described in Chem. Rev. 2000, Vol. 100, No. 4, 1169 ff.

The process is particularly well-suited to organic transition metal compounds having at least one cyclopentadienyl ligand. Particularly useful complexes of this type are those of the formula (I)

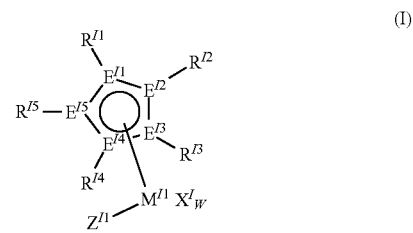

where the substituents and indices have the following meanings:
$M^{I1}$ is titanium, zirconium, hafnium, vanadium, niobium, tantalum, chromium, molybdenum or tungsten or an element of group 3 of the Periodic Table and of the lanthanides,
$X^I$ is fluorine, chlorine, bromine, iodine, hydrogen, $C_1$-$C_{10}$-alkyl, 5- to 7-membered cycloalkyl or cycloalkenyl, $C_2$-$C_{10}$-alkenyl, $C_6$-$C_{22}$-aryl, alkylaryl having from 1 to 10 carbon atoms in the alkyl part and from 6 to 20 carbon atoms in the aryl part, —$OR^{I6}$ or —$NR^{I6}R^{I7}$, or two radicals $X^A$ form a substituted or unsubstituted diene ligand, in particular a 1,3-diene ligand, and the radicals $X^A$ are identical or different and may be joined to one another,
$E^{I1}$-$E^{I5}$ are each carbon or not more than one $E^{I1}$ to $E^{I5}$ is phosphorus or nitrogen, preferably carbon,
w is 1, 2 or 3 and, depending on the valence of $M^{I1}$, has the value at which the complex of the general formula (I) is uncharged,
where
$R^{I1}$ to $R^{I5}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{I8}_2$, $N(SiR^{I8}_3)_2$, $OR^{I8}$, $OSiR^{I8}_3$, $SiR^{I8}_3$, where the organic radicals $R^{I1}$-$R^{I5}$ may also be substituted by halogens and/or two radicals $R^{I1}$-$R^{I5}$, in particular vicinal radicals, may also be joined to form a five-, six- or seven-membered ring, and/or two vicinal radicals $R^{I1}$-$R^{I5}$ may be joined to form a five-, six- or seven-membered heterocycle which contains at least one atom from the group consisting of N, P, O and S,
$R^{I6}$ and $R^{I7}$ are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, where the organic radicals $R^{I6}$ and $R^{I7}$ may also be substituted by halogens and/or two radicals $R^{I8}$ and $R^{I7}$ may also be joined to form a five-, six- or seven-membered ring, or $SiR^{I8}_3$ and the radicals $R^{J8}$ can be identical or different and can each be $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{J8}$ may also be substituted by halogens and/or two radicals $R^{J8}$ may also be joined to form a five-, six- or seven-membered ring, and $Z^{J1}$ is $X^J$ or

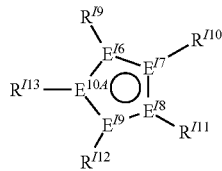

where the radicals $R^{J9}$ to $R^{J13}$ are each, independently of one another, hydrogen, $C_1$-$C_{22}$-alkyl, 5- to 7-membered cyclkoalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $R^{J14}$—C(O)O, $R^{J14}$—C(O)NR$^{J14}$, NR$^{J14}_2$, N(SiR$^{J14}_3$)$_2$, OR$^{J14}$, OSiR$^{J14}_3$, SiR$^{J14}_3$, where the organic radicals $R^{J9}$-$R^{J13}$ may also be substituted by halogens and/or two radicals $R^{J9}$-$R^{J13}$, in particular vicinal radicals, may also be joined to form a five-, six- or seven-membered ring, and/or two vicinal radicals $R^{J9}$-$R^{J13}$ may be joined to form a five-, six- or seven-membered heterocycle which contains at least one atom from the group consisting of N, P, O and S, where the radicals $R^{J14}$ are identical or different and are each $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{J14}$ may also be substituted by halogens and/or two radicals $R^{J14}$ may also be joined to form a five-, six- or seven-membered ring, and $E^{J6}$-$E^{J10}$ are each carbon or not more than one $E^{J6}$ to $E^{J10}$ is phosphorus or nitrogen, preferably carbon or the radicals $R^{J4}$ and $Z^{J1}$ together form an —$R^{J15}_v$-$A^{J1}$- group, where $R^{J15}$ is

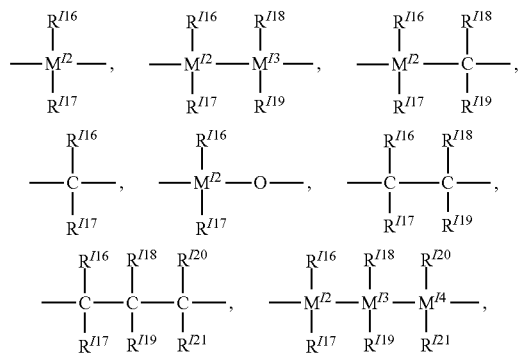

=BR$^{J16}$, =BNR$^{J16}$R$^{J17}$, =AlR$^{J16}$, —Ge—, —Sn—, —O—, —S—, —SO—, =SO$_2$, =NR$^{J16}$, =CO, =PR$^{J16}$ or =P(O)R$^{J16}$, where $R^{J16}$-$R^{J21}$ are identical or different and are each a hydrogen atom, a halogen atom, a trimethylsilyl group, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{J16}$-$R^{J21}$ may also be substituted by halogens and/or two radicals $R^{J6}$-$R^{J21}$ may also be joined to form a five-, six- or seven-membered ring, and $M^{J2}$-$M^{J4}$ are each silicon, germanium or tin, preferably silicon, $A^{J1}$ is

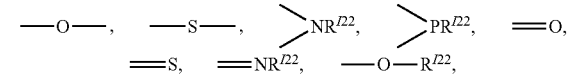

—NR$^{J22}_2$, —PR$^{J22}_2$ or an unsubstituted, substituted or fused, heterocyclic ring system, where the radicals $R^{J22}$ are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part or Si(R$^{J23}$)$_3$, where the organic radicals $R^{J22}$ may also be substituted by halogens and/or two radicals $R^{J22}$ may also be joined to form a five-, six- or seven-membered ring, $R^{J23}$ is hydrogen, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, where the organic radicals $R^{J23}$ may also be substituted by halogens and/or two radicals $R^{J23}$ may also be joined to form a five-, six- or seven-membered ring, v is 1 or when $A^{J1}$ is an unsubstituted, substituted or fused, heterocyclic ring system may also be 0, or the radicals $R^{J4}$ and $R^{J12}$ together form an —$R^{J15}$— group.

Such complexes can be synthesized by methods known per se, with preference being given to reacting the appropriately substituted, cyclic hydrocarbon anions with halides of titanium, zirconium, hafnium or chromium.

$A^{J1}$ can, for example together with the bridge $R^{J15}$, form an amine, ether, thioether or phosphine. $A^{J1}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups, which can contain from 1 to 4 nitrogen atoms and/or a sulfur or oxygen atom as ring atoms in addition to carbon atoms, are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups, which can contain from one to four nitrogen atoms and/or a phosphorus atom, are 2-pyridinyl, 2-phosphabenzolyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957.

The radicals $X^I$ in the general formula (I) are preferably identical and are preferably fluorine, chlorine, bromine, $C_1$-$C_7$alkyl or aralkyl, in particular chlorine, methyl or benzyl.

This type of complexes of the formula (I) also includes compounds having at least one ligand which is formed by a cyclopentadienyl or heterocyclopentadienyl and a fused-on heterocycle, with the heterocycles preferably being aromatic and preferably containing nitrogen and/or sulfur. Such compounds are described, for example, in WO 98/22486. These are, in particular, dimethylsilanediyl(2-methyl-4-phenylindenyl)(2,5-dimethyl-N-phenyl-4-azapentalene)zirconium dichloride, dimethylsilanediylbis(2-methyl-4-phenyl-4-hydroazulenyl)zirconium dichloride, dimethylsilanediylbis(2-ethyl-4-phenyl-4-hydroazulenyl)zirconium dichloride, bis(2,5-dimethyl-N-phenyl-4-azapentalene)zirconium dichloride or (indenyl)(2,5-dimethyl-N-phenyl-4-azapentalene)zirconium dichloride.

Among the complexes of the general formula (I), preference is given to

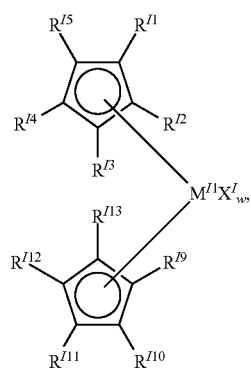

(Ia)

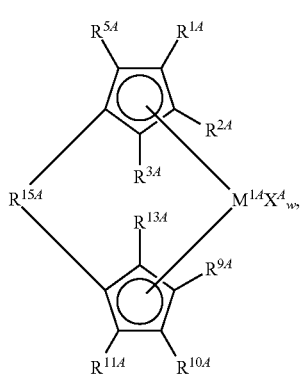

(Ib)

where $M^{I1}$-$M^{I4}$, $X^I$, $E^{I1}$-$E^{I10}$, w, $R^{I1}$ to $R^{I23}$, $R^{I4}$, $E^{I6}$-$E^{I10}$, $A^{I1}$, v Among the complexes of the formula (Ia), preference is given to those in which $M^{I1}$ is zirconium, hafnium or chormium, $X^A$ is fluorine, chlorine, $C_1$-$C_4$-alkyl or benzyl, or two radicals $X^A$ form a substituted or unsubstituted butadiene ligand, t is 0 in the case of chromium and otherwise 1 or 2, preferably 2, $R^{I1}$ to $R^{I5}$ are each hydrogen, $C_1$-$C_8$-alkyl, $C_6$-$C_{10}$-aryl, $NR^{I8}_2$, $OSiR^{I8}_3$ or $Si(R^{I8})_3$ and $R^{I9}$ to $R^{I13}$ are each hydrogen, $C_1$-$C_8$-alkyl or $C_6$-$C_{10}$-aryl, $NR^{I14}_2$, $OSiR^{I14}_3$ or $Si(R^{I14})_3$ and $R^{I8}$ and $R^{I14}$ can be identical or different and can each be $C_1$-$C_{10}$-alkyl, 5- to 7-membered cycloalkyl or cycloalkenyl, $C_6$-$C_{22}$-aryl, $C_1$-$C_{10}$-alkoxy or $C_6$-$C_{10}$-aryloxy, where the organic radicals $R^{I8}$ and $R^{I14}$ may also be substituted by halogens and/or two radicals $R^{I8}$ or $R^{I14}$ may also be joined to form a five-, six- or seven-membered ring, or two radicals $R^{I1}$ to $R^{I5}$ and/or $R^{I9}$ to $R^{I13}$ together with the $C_5$ ring form an indenyl, fluorenyl or substituted indenyl or fluorenyl system.

Particularly useful complexes of the formula (Ia) are ones in which the cyclopentadienyl radicals are identical.

Examples of particularly useful complexes of the formula (Ia) are those in which $M^{I1}$ is hafnium and $X^A$ is fluorine, chlorine, $C_1$-$C_4$-alkyl or benzyl, or two radicals $X^A$ form a substituted or unsubstituted butadiene ligand, t is 2, $R^{I1}$ to $R^{I5}$ are identical or different and are each hydrogen, $C_1$-$C_8$-alkyl, $C_6$-$C_{10}$-aryl, and $R^{I9}$ to $R^{I13}$ are identical or different and are each hydrogen, $C_1$-$C_8$-alkyl or $C_6$-$C_{10}$-aryl, $R^{I8}$ and $R^{I4}$ can be identical or different and can each be $C_1$-$C_{10}$-alkyl, 5- to 7-membered cycloalkyl or cycloalkenyl, $C_6$-$C_{22}$-aryl, $C_1$-$C_{10}$-alkoxy or $C_6$-$C_{10}$-aryloxy, where the organic radicals $R^{I8}$ and $R^{I14}$ may also be substituted by halogens and/or two radicals $R^{I8}$ or $R^{I14}$ may also be joined to form a five-, six- or seven-membered ring, or two radicals $R^{1.4}$ to $R^{I5}$ and/or $R^{I9}$ to $R^{I13}$ together with the $C_5$ ring form an indenyl, fluorenyl or substituted indenyl or fluorenyl system.

Specific examples are:
bis(cyclopentadienyl)hafnium dichloride, bis(indenyl)hafnium dichloride, bis(fluorenyl)hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethylcyclopentadienyl)hafnium dichloride, bis(1-n-butyl-3-methylcyclopentadienyl)hafnium dichloride, (cyclopentadienyl)(methylcyclopentadienyl)hafnium dichloride, (cyclopentadienyl)(n-butylcyclopentadienyl)hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis(tetramethylcyclopentadienyl)hafnium dichloride, and also the corresponding dimethylhafnium compounds.

A further preferred group of complexes of formula (Ia) are those in which:
$M^{I.4}$ is zirconium,
$X^A$ is fluorine, chlorine, $C_1$-$C_4$-alkyl or benzyl, or two radicals $X^A$ form a substituted or unsubstituted butadiene ligand,
t is 1 or 2, preferably 2,
$R^{I.4}$ to $R^{I5}$ are each hydrogen, $C_1$-$C_8$-alkyl, $C_6$-$C_{10}$-aryl, $OSiR^{I8}_3$ and
$R^{I9}$ to $R^{I13}$ are each hydrogen, $C_1$-$C_8$-alkyl or $C_6$-$C_{10}$-aryl, $OSiR^{I14}_3$ and
$R^{I8}$ and $R^{I14}$ can be identical or different and can each be $C_1$-$C_{10}$-alkyl, 5- to 7-membered cycloalkyl or cycloalkenyl, $C_6$-$C_{15}$-aryl, $C_1$-$C_{10}$-alkoxy or $C_8$-$C_{10}$-aryloxy, where the organic radicals $R^{I8}$ and $R^{I14}$ may also be substituted by halogens and/or two radicals $R^{I8}$ or $R^{I14}$ may also be joined to form a five-, six- or seven-membered ring, or two radicals $R^{I.4}$ to $R^{I5}$ and/or $R^{I9}$ to $R^{I13}$ together with the $C_5$ ring form an indenyl, fluorenyl or substituted indenyl or fluorenyl system.

Particularly useful complexes of the formula (Ib) are those in which
$R^{I15}$ is

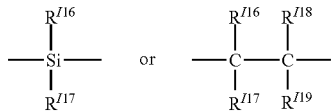

$M^{I1}$ is titanium, zirconium or hafnium, in particular zirconium or hafnium,
the radicals $X^I$ are identical or different and are each chlorine, $C_1$-$C_4$-alkyl, benzyl, phenyl or $C_7$-$C_{15}$-alkylaryloxy.

Further preferred complexes of the formula (Ib) are bridged bisindenyl complexes in the rac or pseudorac form, where the term pseudorac refers to complexes in which the two indenyl ligands are in the rac arrangement relative to one another when all other substituents of the complex are disregarded.

Further examples of particularly useful complexes (Ib) are dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(tetramethylcyclopentadienyl)zirconium dichloride, dimethylsilanediylbis(3-trimethylsilylcyclopentadienyl)zirconium dichloride, dimethylsilanediylbis(3-methylcyclopentadienyl)zirconium dichloride, dimethylsilanediylbis(3-n-butylcyclopentadienyl)zirconium dichloride, dimethylsilanediylbis(3-tert-butyl-5-methylcyclopentadienyl)zirconium dichloride, dimethylsilanediylbis(3-tert-butyl-5-ethylcyclopentadienyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, dimethylsilanediylbis(3-methyl-5-methylcyclopentadienyl)zirconium dichloride, dimethylsilanediylbis(3-ethyl-5-isopropylcyclopentadienyl)zirconium dichloride, dimethylsilanediylbis(2-ethylindenyl)zirconium dichloride, dimethylsilanediylbis(2-methyl-4,5-benzindenyl)zirconium dichloride, dimethylsilanediylbis(2-ethyl-4,5-benzindenyl)zirconium dichloride, methylphenylsilanediylbis(2-methyl-4,5-benzindenyl)zirconium dichloride, methylphenylsilanediylbis(2-ethyl-4,5-benzindenyl)zirconium dichloride, diphenylsilanediylbis(2-methyl-4,5-benzindenyl)zirconium dichloride, diphenylsilanediylbis(2-ethyl-4,5-benzindenyl)zirconium dichloride, diphenylsilanediylbis(2-methylindenyl)hafnium dichloride, dimethylsilanediylbis(2-methyl-4-phenylindenyl)zirconium dichloride, dimethylsilanediylbis(2-ethyl-4-phenylindenyl)zirconium dichloride, dimethylsilanediylbis(2-methyl-4-(1-naphthylindenyl)zirconium dichloride, dimethylsilanediylbis(2-ethyl-4-(1-naphthylindenyl)zirconium dichloride, dimethylsilanediylbis(2-propyl-4-(1-naphthyl)indenyl)zirconium dichloride, dimethylsilanediylbis(2-i-butyl-4-(1-naphthyl)indenyl)zirconium dichloride, dimethylsilanediylbis(2-propyl-4-(9-phenanthryl)indenyl)zirconium dichloride, dimethylsilanediylbis(2-methyl-4-isopropylindenyl)zirconium dichloride, dimethylsilanediylbis(2,7-dimethyl-4-isopropylindenyl)zirconium dichloride, dimethylsilanediylbis(2-methyl-4,6-diisopropylindenyl)zirconium dichloride, dimethylsilanediylbis(2-methyl-4[p-trifluoromethylphenyl]indenyl)zirconium dichloride, dimethylsilanediylbis(2-methyl-4-[3',5'-dimethyl-phenyl]indenyl)zirconium dichloride, dimethylsilanediylbis(2-methyl-4-[4'-tert-butyl-phenyl]indenyl)zirconium dichloride, diethylsilanediylbis(2-methyl-4-[4'-tert-butylphenyl]indenyl)zirconium dichloride, dimethylsilanediylbis(2-ethyl-4-[4'-tert-butylphenyl]indenyl)zirconium dichloride, dimethylsilanediylbis(2-propyl-4-[4'-tert-butylphenyl]indenyl)zirconium dichloride, dimethylsilanediylbis(2-isopropyl-4-[4'-tert-butylphenyl]indenyl)zirconium dichloride, dimethylsilanediylbis(2-n-butyl-4-[4'-tert-butylphenyl]indenyl)zirconium dichloride, dimethylsilanediylbis(2-hexyl-4-[4'-tert-butylphenyl]indenyl)zirconium dichloride, dimethylsilanediyl(2-isopropyl-4-phenylindenyl)(2-methyl-4-phenylindenyl)zirconium dichloride, dimethylsilanediyl(2-isopropyl-4-(1-naphthyl)indenyl)(2-methyl-4-(1-naphthylindenyl)zirconium dichloride, dimethylsilanediyl(2-isopropyl-4-[4'-tert-butylphenyl]indenyl)(2-methyl-4-[4'-tert-butylphenyl]indenyl)zirconium dichloride, dimethylsilanediyl(2-isopropyl-4-[4'-tert-butylphenyl]indenyl)(2-ethyl-4-[4'-tert-butylphenyl]indenyl)zirconium dichloride, dimethylsilanediyl(2-isopropyl-4-[4'-tert-butylphenyl]indenyl)(2-methyl-4-[3',5'-bis-tert-butylphenyl]indenyl)zirconium dichloride, dimethylsilanediyl(2-isopropyl-4-[4'-tert-butylphenyl]indenyl)(2-methyl-4-[1'-naphthyl]indenyl)zirconium dichloride and ethylene(2-isopropyl-4-[4'-tert-butylphenyl]indenyl)(2-methyl-4-[4'-tert-butylphenyl]indenyl)zirconium dichloride, and also the corresponding dimethylzirconium, mono-chloromono(alkylaryloxy)zirconium and di(alkylaryloxy)zirconium compounds. The complexes are preferably used in the rac form.

The preparation of such systems is disclosed, for example, in WO 97/28170 A1.

Such complexes can be synthesized by methods known per se, with preference being given to reacting the appropriately substituted, cyclic hydrocarbon anions with halides of titanium, zirconium, hafnium, vanadium, niobium, tantalum or chromium. Examples of appropriate preparative methods are described, inter alia, in the Journal of Organometallic Chemistry, 369 (1989), 359-370.

Suitable as a second active catalyst components are late transition metal complexes of the general formula (II),

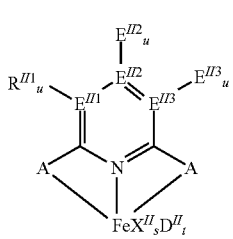

(II)

wherein the variables have the following meaning:
A independently from one another denote

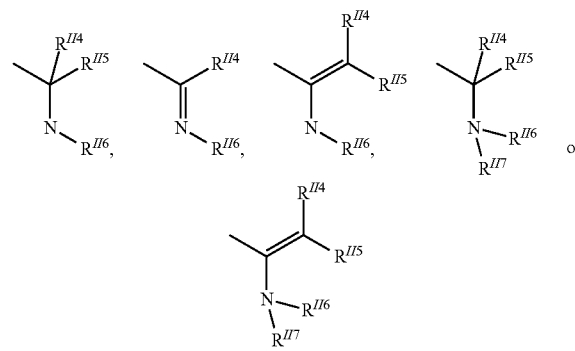

$R^{II1}$-$R^{II3}$ independently of one another denote hydrogen, $C_1$-$C_{22}$-alkyl, $C_2$-$C_{22}$-alkenyl, $C_6$-$C_{22}$-aryl, $NR^{II9}{}_2$, $OR^{II9}$, halogen, $SiR^{II8}{}_3$ or five-, six- or seven-membered heterocycles, which comprise at least one atom from the group consisting of N, P, O or S, wherein the organic radicals $R^{II1}$-$R^{II3}$ are optionally substituted by halogen radicals, $C_1$-$C_{10}$-alkyl radicals, $C_2$-$C_{10}$-alkenyl radicals, $C_6$-$C_{20}$-aryl radicals, $NR^{II9}{}_2$, $OR^{II9}$ or $SiR^{II8}{}_3$ and/or two radicals $R^{II1}$-$R^{II3}$ are bonded with one another to form a five-, six- or seven-membered ring and/or two radicals $R^{II1}$-$R^{II3}$ are bonded with one another to form a five-, six- or seven-membered heterocycle, which comprises at least one atom from the group consisting of N, P, O or S, $R^{II4}$, $R^{II5}$ independently of one another denote hydrogen, $C_1$-$C_{20}$-alkyl, $C_2$-$C_{20}$-alkenyl, $C_6$-$C_{20}$-aryl, or $SiR^{II8}{}_3$, wherein the organic radicals $R^{II4}$, $R^{II5}$ are optionally substituted by halogen radicals, $C_1$-$C_{10}$-alkyl radicals, $C_2$-$C_{10}$-alkenyl radicals, or $C_6$-$C_{20}$-aryl radicals, or two radicals $R^{II4}$, $R^{II5}$ are bonded with one another to form a five- or six-membered carbon ring, $R^{II6}$, $R^{II7}$ independently of one another denote hydrogen, $C_1$-$C_{20}$-alkyl, $C_2$-$C_{20}$-alkenyl, $C_6$-$C_{20}$-aryl, or $SiR^{II8}{}_3$, wherein the organic radicals $R^{II6}$, $R^{II7}$ are optionally substituted by halogen radicals, $C_1$-$C_{10}$-alkyl radicals, $C_2$-$C_{10}$-alkenyl radicals, or $C_6$-$C_{20}$-aryl radicals, or the two radicals $R^{II6}$, $R^{II7}$ are bonded with one another to form a five- or six-membered carbon ring, $R^{II8}$ independently of one another denote hydrogen, $C_1$-$C_{22}$-alkyl, $C_2$-$C_{22}$-alkenyl, $C_6$-$C_{22}$-aryl, arylalkyl having 1 to 10 carbon atoms in the alkyl radical and 6 to 20 carbon atoms in the aryl radical, $R^{II9}$ independently of one another denote hydrogen, $C_1$-$C_{22}$-alkyl, $C_2$-$C_{22}$-alkenyl, $C_6$-$C_{22}$-aryl, or $SiR^{II8}{}_3$, wherein the organic radicals $R^{II9}$ is optionally substituted by halogen radicals, $C_1$-$C_{10}$-alkyl radicals, $C_2$-$C_{10}$-alkenyl radicals, or $C_6$-$C_{20}$-aryl radicals, and/or two radicals $R^{II9}$ are bonded with one another to form a five- or six-membered ring, $E^{II1}$-$E^{II3}$ independently of one another denote carbon or nitrogen, u independently of one another is 0 if the respective radical is bound to nitrogen and 1 if the respective radical is bound to carbon, $X^{II}$ independently of one another denote fluorine, chlorine, bromine, iodine, hydrogen, $C_1$-$C_{10}$-alkyl, $C_2$-$C_{10}$-alkenyl, $C_6$-$C_{20}$-aryl, $NR^{II10}{}_2$, $OR^{II10}$, $SR^{II10}$, $OC(O)R^{II10}$, CN, SCN, β-diketonate, CO, $BF_4^-$, $PF_6^-$ or bulky non-coordinating anions, wherein the organic radicals $X^{II}$ is optionally substituted by halogen radicals, $C_1$-$C_{10}$-alkyl radicals, $C_2$-$C_{10}$-alkenyl radicals, or $C_6$-$C_{20}$-aryl radicals, and the radicals $X^{II}$ are optionally bonded with one another, $R^{II10}$ independently of one another denote hydrogen, $C_1$-$C_{22}$-alkyl, $C_2$-$C_{22}$-alkenyl, $C_6$-$C_{22}$-aryl, or $SiR^{II11}{}_3$, wherein the organic radicals $R^{II10}$ are optionally substituted by halogen radicals, $C_1$-$C_{10}$-alkyl radicals, $C_2$-$C_{10}$-alkenyl radicals, or $C_6$-$C_{20}$-aryl radicals, $R^{II11}$ independently of one another denote hydrogen, $C_1$-$C_{20}$-alkyl, $C_2$-$C_{20}$-alkenyl, $C_6$-$C_{20}$-aryl, wherein the organic radicals $R^{II11}$ optionally substituted by halogen radicals, $C_1$-$C_{10}$-alkyl radicals, $C_2$-$C_{10}$-alkenyl radicals, or $C_6$-$C_{20}$-aryl radicals, s is 1, 2, 3 or 4,
$D^{II}$ is a neutral donor,
t is 0 to 4.

The three atoms $E^{II1}$ to $E^{II3}$ are each preferably carbon.

The substituents $R^{II1}$-$R^{II3}$ can be varied within a wide range. Possible carboorganic substituents $R^{II1}$-$R^{II3}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two vicinal radicals $R^{II1}$ to $R^{II3}$ are optionally joined to form a 5-, 6- or 7-membered carbon ring or a five-, six- or seven-membered heterocycle containing at least one atom from the group consisting of N, P, O and S and/or the organic radicals $R^{II1}$-$R^{II3}$ are unsubstituted or substituted by halogens such as fluorine, chlorine or bromine. Furthermore, $R^{II1}$-$R^{II3}$ can also be amino $NR^{II9}{}_2$ or $N(SiR^{II8}{}_3)_2$, alkoxy or aryloxy $OR^{II9}$, for example dimethylamino, N-pyrrolidinyl, picolinyl, methoxy, ethoxy or isopropoxy or halogen such as fluorine, chlorine or bromine.

Preferred radicals $R^{II1}$-$R^{II3}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

The substituents $R^{II4}$-$R^{II7}$, too, can be varied within a wide range. Possible carboorganic substituents $R^{II4}$-$R^{II7}$ are, for example, the following: $C_1$-$C_{22}$-alkyl which are linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which are linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl, where the arylalkyl may be substituted by further alkyl groups, e.g. benzyl, o-, m-, p-methylbenzyl, 1- or 2-ethylphenyl, where two geminal radicals $R^{II4}$ to $R^{II7}$ optionally are joined to form a 5-, 6- or 7-membered carbon ring and/or a five-, six- or seven-membered heterocycle containing at least one atom from the group consisting of N, P, O and S and/or the organic radicals $R^{II4}$-$R^{II7}$ are unsubstituted or substituted by halogens such as fluorine, chlorine or bromine. Furthermore, $R^{II4}$-$R^{II7}$ may be amino $NR^{II9}{}_2$ or $N(SiR^{II8}{}_3)_2$, for example dimethylamino, N-pyrrolidinyl or picolinyl. Possible radicals $R^{II8}$ in organosilicone substituents $SiR^{II8}{}_3$ are the same carboorganic radicals as have been described above for $R^{II1}$-$R^{II3}$, where two $R^{II9}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{II9}{}_3$ radicals can also be bound via nitrogen to the carbon bearing them.

Preferred radicals $R^{II4}$-$R^{II7}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl. Preference is also given to amide substituents $NR^{II9}{}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl) amide, didecylamide, N-methyloctadecylamide, N-methylcyclohexylamide, N-ethylcyclohexylamide, N-isopropylcyclohexylamide, N-tert-butylcyclohexylamide, dicyclohexylamide, pyrrolidine, piperidine, hexamethylenimine, decahydroquinoline, diphenylamine, N-methylanilide or N-ethylanilide.

Variation of the radicals $R^{II9}$ enables, for example, physical properties such as solubility to be finely adjusted. Possible carboorganic substituents $R^{II9}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{II9}$ may also be joined to form a 5- or 6-membered ring and the organic radicals $R^{I9}$ may also be substituted by halogens such as fluorine, chlorine or bromine. Possible radicals $R^{II8}$ in organosilicon substituents $SiR^{II8}{}_3$ are the same radicals as described above for $R^{II9}$, where two radicals $R^{II8}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{II9}$.

The ligands $X^{II}$ result, for example, from the choice of the appropriate starting metal compounds used for the synthesis of the iron complexes, but can also be varied afterwards. Possible ligands $X^{II}$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^{II}$. As further ligands $X^{II}$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_5)_4^-$. Amides, alkoxides, sulfonates, carboxylates and β-diketonates are also particularly useful ligands $X^{II}$. Some of these substituted ligands $X^{II}$ are particularly preferably used since they are obtainable from cheap and readily available starting materials. Thus, a particularly preferred embodiment is that in which $X^{II}$ is dimethylamide, methoxide, ethoxide, isopropoxide, phenoxide, naphthoxide, triflate, p-toluenesulfonate, acetate or acetylacetonate.

The number s of the ligands $X^{II}$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

$D^{II}$ is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands $D^{II}$ can be from 0 to 4 and is often dependent on the solvent in which the iron complex is prepared and the time for which the resulting complexes are dried and can therefore also be a nonintegral number such as 0.5 or 1.5. In particular, t is 0, 1 to 2.

Preferably, the iron catalyst is of formula (IIa)

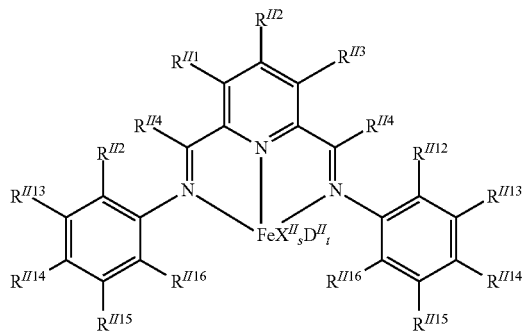

(IIa)

wherein the variables have the following meaning:
$R^{II1}$, $R^{II2}$, $R^{II3}$, $R^{II8}$, $R^{II9}$, $X^{II}$, $D^{II}$, s and t are as defined for formula (II), $R^{II4}$ independently of one another denote hydrogen, $C_1$-$C_{20}$-alkyl, $C_2$-$C_{20}$-alkenyl, $C_6$-$C_{20}$-aryl, arylalkyl having 1 to 10 carbon atoms in the alkyl radical and 6 to 20 carbon atoms in the aryl radical, or $SiR^{II8}{}_3$, wherein the organic radicals $R^{II4}$ can also be substituted by halogens, $R^{II12}$-$R^{II16}$ independently of one another denote hydrogen, $C_1$-$C_{22}$-alkyl, $C_2$-$C_{22}$ alkenyl, $C_6$-$C_{22}$-aryl, arylalkyl having 1 to 10 carbon atoms in the alkyl radical and 6 to 20 carbon atoms in the aryl radical, $NR^{II9}{}_2$, $OR^{II9}$, halogen, $SiR^{II8}{}_3$ or five-, six- or seven-membered heterocyclyl, which comprises at least one atom from the group consisting of N, P, O or S, wherein the organic radicals $R^{II12}$-$R^{II16}$ are unsubstituted or substituted by halogens, $NR^{II9}{}_2$, $OR^{II9}$ or $SiR^{II8}{}_3$ or two radicals $R^{II12}$-$R^{II16}$ are bonded with one another to form a five-, six- or seven-membered ring or two radicals $R^{II12}$-$R^{II18}$ are bonded with one another to form a five-, six- or seven-membered heterocyclyl, which comprises at least one atom from the group consisting of N, P, O or S, wherein at least one of the radicals $R^{II12}$-$R^{II16}$ is selected from the group consisting of chlorine, bromine, iodine, $CF_3$ or $OR^{II9}$.

The substituents $R^{II4}$ can be varied within a wide range. Possible carboorganic substituents $R^{II4}$ are, for example, the following: hydrogen, $C_1$-$C_{22}$-alkyl which is linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which is unsubstituted or bears a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which is linear, cyclic or branched and in which the double bond is internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which is may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{II4}$ are unsubstituted or substituted by halogens such as fluorine, chlorine or bromine. Furthermore, $R^{II4}$ can be amino $NR^{II9}{}_2$ or $N(SiR^{II8}{}_3)_2$, for example dimethylamino, N-pyrrolidinyl or picolinyl. Possible radicals $R^{II8}$ in organosilicon substituents $SiR^{II8}{}_3$ are the same carboorganic radicals as described above for $R^{II1}$-$R^{II3}$ in formula (II), where two radicals $R^{II19}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{II19}{}_3$ radicals can also be bound via nitrogen to the carbon bearing them.

Preferred radicals $R^{II4}$ are hydrogen, methyl, ethyl, n-propyl, isopropyl, n-butyl, isobutyl, tert-butyl, n-pentyl, n-hexyl, n-heptyl, n-octyl or benzyl, in particular hydrogen or methyl.

The substituents $R^{II12}$-$R^{II16}$ can be varied within a wide range. Possible carboorganic substituents $R^{II12}$-$R^{II16}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two vicinakl radicals $R^{II12}$-$R^{II16}$ are optionally joined to form a 5-, 6- or 7-membered ring and/or a five-, six- or seven-membered heterocycle containing at least one atom from the group consisting of N, P, O and S and/or the organic radicals $R^{II12}$-$R^{II16}$ are unsubstituted or substituted by halogens such as fluorine, chlorine or bromine. Furthermore, $R^{II12}$-$R^{II16}$ can also be amino $NR^{II9}{}_2$ or $N(SiR^{II8}{}_3)_2$, alkoxy or aryloxy $OR^{II9}$, for example dimethylamino, N-pyrrolidinyl, picolinyl, methoxy, ethoxy or isopropoxy or halogen such as fluorine, chlorine or bromine. Possible radicals $R^{II8}$ in organosilicon substituents $SiR^{II8}{}_3$ are the same carboorganic radicals as have been described above in formula (II).

Preferred radicals $R^{II12}$, $R^{II16}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{II12}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine and $R^{II16}$ are each a halogen such as fluorine, chlorine or bromine. Particular preference is given to $R^{II12}$ each being a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl and $R^{II16}$ each being a halogen such as fluorine, chlorine or bromine.

Preferred radicals $R^{II13}$-$R^{II15}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. It is in particular preferred, that $R^{II14}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{II13}$ and $R^{II15}$ are each hydrogen.

In the most preferred embodiment the radicals $R^{II13}$ and $R^{II15}$ are identical, $R^{II12}$ are identical, $R^{II14}$ are identical, and $R^{II16}$ are identical.

Suitable compounds as cocatalysts are activating compounds which are able to react with the transition metal complexes to convert them into a catalytically active or more active compound. Such activating compounds are, for example, aluminoxanes, strong uncharged Lewis acids, ionic compounds having Lewis-acid cations or ionic compounds containing Brönsted acids as cations. For activation of both the at least two active catalyst compounds either the same kind of cocatalyst can be used or different cocatalysts can be used. In case of metallocenes and tridendate iron complexes aluminoxanes are especially preferred.

Particularly useful aluminoxanes are open-chain or cyclic aluminoxane compounds of the general formula (III) or (IV)

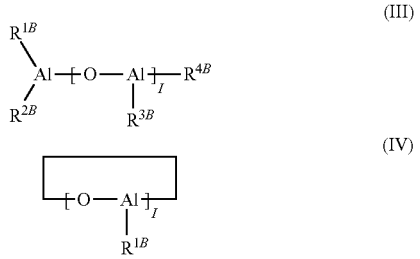

where $R^{1B}$-$R^{4B}$ are each, independently of one another, a $C_1$-$C_6$-alkyl group, preferably a methyl, ethyl, butyl or isobutyl group and l is an integer from 1 to 40, preferably from 4 to 25.

A particularly useful aluminoxane compound is methyl aluminoxane (MAO).

Furthermore modified aluminoxanes in which some of the hydrocarbon radicals have been replaced by hydrogen atoms or alkoxy, aryloxy, siloxy or amide radicals can also be used in place of the aluminoxane compounds of the formula (III) or (IV) as activating compound.

Boranes and boroxines are particularly useful as activating compound, such as trialkylborane, triarylborane or trimethylboroxine. Particular preference is given to using boranes which bear at least two perfluorinated aryl radicals. More preferably, a compound selected from the list consisting of triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5-trifluorophenyl)borane is used, most preferably the activating compound is tris(pentafluorophenyl)borane. Particular mention is also made of borinic acids having perfluorinated aryl radicals, for example $(C_6F_5)_2BOH$. Compounds containing anionic boron heterocycles as described in WO 97/36937 A1 incorporated hereto by reference, such as for example dimethyl anilino borato benzenes or trityl borato benzenes, can also be used suitably as activating compounds.

Further suitable activating compounds are listed in WO 00/31090 A1 and WO 99/06414 A1, here incorporated by reference.

Preferred is the preparation of a supported catalyst system. The first active catalyst compound and its activating compound can be immobilized independently of one another, e.g. in succession or simultaneously. Thus, the support component can firstly be brought into contact with the activating compound or compounds or the support component can firstly be brought into contact with the first active catalyst compound. Preactivation of the first active catalyst compound by means of one or more activating compounds prior to mixing with the support is also possible and preferred.

The immobilization is generally carried out in an inert solvent which can be removed by filtration or evaporation after the immobilization. After the individual process steps, the solid can be washed with suitably inert solvents such as aliphatic or aromatic hydrocarbons and dried. However, the use of the still moist, supported catalyst is also possible.

In a preferred method of preparing the supported catalyst system, at least one metallocene of formula (I) is brought into contact with an activating compound in a suitable solvent and subsequently mixed with the dehydrated or passivated support material. The iron complex of formula (II) is likewise brought into contact with at least one activating compound, preferably MAO, in a suitable solvent, e.g. toluene. The preparation obtained in this way is then mixed with the immobilized metallocene, which is used directly or, preferably, after the solvent has been separated off. The resulting supported catalyst system is preferably dried to ensure that all or most of the solvent is removed from the pores of the support material. The supported catalyst is preferably obtained as a free-flowing powder. Examples of the industrial implementation of the above process are described in WO 96/00243 A1, WO 98/40419 A1 or WO 00/05277 A1.

The metallocene is preferably applied in such an amount that the concentration of the metallocene in the finished catalyst system is from 1 to 200 µmol, preferably from 5 to 100 µmol and particularly preferably from 10 to 70 µmol, per g of support. The iron complex is preferably applied in such an amount that the concentration of iron from the iron complex in the finished catalyst system is from 0.1 to 20 µmol, preferably from 0.5 to 10 µmol and particularly preferably from 1 to 7 µmol, per g of support.

Preferably the activation and supportation steps are performed in a suitable solvent. Suitable solvents are aprotic solvents, in particular hydrocarbons such as aromatic hydrocarbons having 6-20 carbon atoms, e.g. toluene, ethylbenzene or xylene, or aliphatic hydrocarbons having 6-20 carbon atoms, e.g. hexane such as n-hexane or isohexane, heptane, octane or decalin or mixtures of various hydrocarbons. Particular preference is given to toluene, hexane and heptane and also mixtures thereof. The activating compound is preferably present in solution, preferably in a hydrocarbon.

It has been found to be advantageous to activate each of the active catalyst components with the respective activating compound for a period of from 30 minutes to 8 hours, particularly preferably from 30 minutes to 3 hours, after mixing is complete and before addition to the support component. In the following, activation means that the active catalyst compound and the activating compound in the mixture are given time to react with one another. The mixture is preferably stirred during this time.

In the above process the activation of two active catalyst components of the catalyst system of the invention is performed at different temperatures. The difference of the temperatures is at least 15° C., preferably at least 20° C. Activation of the first active catalyst component can be carried out at temperatures of from 15 to 150° C. and preferably at temperatures of from 40 to 120° C. In the case of hafnocenes and zirconocenes a preferred activation temperature is in the range from 40 to 80° C. Activation of the second active catalyst component can be carried out at temperatures of from 0 to 135° C. and preferably carried out at temperatures of from 10 to 100° C. In the case of the preferred iron catalysts the preferred activation temperature is in the range from 10 to 30° C.

The activity of the catalyst system of the invention can be significantly improved in this way. Mixing and activation can be carried out in the presence or absence of light, depending on the light sensitivity of the organic transition metal compound.

As support component, preference is given to using finely divided supports which can be any organic or inorganic solid. In particular, the support component can be a porous support such as talc, a sheet silicate such as montmorillonite, mica, an inorganic oxide or a finely divided polymer powder (e.g. polyolefin or a polymer having polar functional groups). The support is dry, i.e. it is not suspended in a solvent and the residual moisture content is less than 5% by weight, preferably less than 2% by weight and particularly preferably less than 0.5% by weight, based on moist support components.

Examples of inorganic supports preferred include silicon dioxide, aluminum oxide and mixed oxides of the elements calcium, aluminum, silicon, magnesium or titanium and also corresponding oxide mixtures. Other inorganic oxides which can be used alone or in combination with the abovementioned preferred oxidic supports are, for example, MgO, CaO, $AlPO_4$, $ZrO_2$, $TiO_2$, $B_2O_3$ or mixtures thereof. Other preferred inorganic support materials are inorganic halides such as $MgCl_2$ or carbonates such as $Na_2CO_3$, $K_2CO_3$, $CaCO_3$, $MgCO_3$, sulfates such as $Na_2SO_4$, $Al_2(SO_4)_3$, $BaSO_4$, nitrates such as $KNO_3$, $Mg(NO_3)_2$ or $Al(NO_3)_3$.

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or a blanket of inert gas (e.g. nitrogen), or the inorganic support can be calcined at temperatures of from 200 to 1000° C., if appropriate to produce the desired structure of the solid and/or to set the desired OH concentration on the surface. The support can also be treated chemically using customary desiccants such as metal alkyls, preferably aluminum alkyls, chlorosilanes or $SiCl_4$, or else methylaluminoxane. The treatment of silica gel with $NH_4SiF_6$ or other fluorinating agents e.g. leads to fluorination of the silica gel surface, or treatment of silica gels with silanes containing nitrogen-, fluorine- or sulfur-containing groups leads to correspondingly modified silica gel surfaces. Appropriate treatment methods are described, for example, in WO 00/31090 A1.

Organic support materials such as finely divided polyolefin powders (e.g. polyethylene, polypropylene or polystyrene) can also be used and are preferably likewise freed of adhering moisture, solvent residues or other impurities by appropriate purification and drying operations before use. It is also possible to use functionalized polymer supports, e.g. ones based on polystyrene, polyethylene, polypropylene or polybutylene, via whose functional groups, for example ammonium or hydroxy groups, at least one of the catalyst components can be immobilized. Polymer blends can also be used.

Particular preference is given to using silica gels as solid support component, since particles whose size and structure make them particularly suitable as supports for olefin polymerization can be produced from this material. In particular spray-dried silica gels comprising spherical agglomerates of smaller granular particles, i.e. primary particles, have been found to be particularly useful. The silica gels can be dried and/or calcined before use.

The silica gels used are generally used as finely divided powders having a mean particle diameter D50 of from 5 to 200 μm, preferably from 10 to 150 μm, particularly preferably from 15 to 100 μm and in particular from 20 to 70 μm, and usually have pore volumes of from 0.1 to 10 $cm^3/g$, preferably from 0.2 to 5 $cm^3/g$, and specific surface areas of from 30 to 1000 $m^2/g$, preferably from 50 to 800 $m^2/g$ and in particular from 100 to 600 $m^2/g$. Typical silica gels suitable for the process of the present invention are available in the market, e.g. from W. R. Grace & Co, Maryland, USA.

The active catalyst compounds are preferably applied in such an amount that the concentration of the sum of active catalyst compounds is from 1 to 200 μmol, preferably from 10 to 150 μmol and particularly preferably from 10 to 80 per g of support component.

The support component can also be brought into contact with a organometallic compound before being brought into contact with the mixture from step A). Preferred organometallic compounds are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof.

After supportation of the second active catalyst component, the solvent is optionally removed completely or partly. This gives a solid in the form of a free-flowing powder. The solvent is preferably removed partly, so that the residual moisture content is from 0 to 60% by weight based on the moist catalyst, preferably from 1 to 50% by weight and particularly preferably 1 to 20% based on the moist catalyst. The catalyst obtained in this way displays very good powder flow. The residual moisture content can be estimated in a simple fashion by calculating the weight of the catalyst on the assumption that all starting materials apart form the solvents have been taken up by the support and comparing this theoretical weight with the actual weight (the yield) of the catalyst. It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization.

The catalyst systems of the invention are suitable for the polymerization of olefins and especially for the polymerization of α-olefins, i.e. hydrocarbons having terminal double bonds. Suitable monomers also include functionalized olefinically unsaturated compounds such as acrolein, ester or amide derivatives of acrylic or methacrylic acid, for example acrylates, methacrylates or acrylonitrile, or vinyl esters, for example vinyl acetate. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethene, propene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,5-hexadiene or 1,7-octadiene or vinylaromatic compounds such as styrene or substituted styrene. It is also possible to polymerize mixtures of various α-olefins. Preference is given to polymerizing at least one olefin selected from the group consisting of ethene, propene, 1-butene, 1-pentene, 1-hexene, 1-heptene, 1-octene and 1-decene.

Suitable olefins also include ones in which the double bond is part of a cyclic structure which can have one or more ring systems. Examples are cyclopentene, cyclohexene, norbornene, tetracyclododecene and methylnorbornene and dienes such as 5-ethylidene-2-norbornene, norbornadiene or ethylnorbornadiene.

Mixtures of two or more olefins can also be polymerized. In particular, the catalyst systems of the invention can be used for the polymerization or copolymerization of ethene or propene. As comonomers in the polymerization of ethene, preference is given to using $C_3$-$C_3$-α-olefins or norbornene, in particular 1-butene, 1-pentene, 1-hexene and/or 1-octene. Preference is given to using monomer mixtures containing at least 50 mol % of ethene. Preferred comonomers in the polymerization of propylene are ethene and/or butene.

The polymerization can be carried out in a known manner in bulk, in suspension, in the gas phase or in a supercritical medium in the customary reactors used for the polymerization of olefins. It can be carried out batchwise or continuously in one or more stages. High-pressure polymerization processes in tube reactors or autoclaves, solution processes, suspension processes, stirred gas-phase processes or gas-phase fluidized-bed processes are all possible.

The polymerizations are usually carried out at temperatures in the range from −60 to 350° C. and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are usually carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, a temperature which is at least a few degrees below the softening temperature of the polymer is generally set. In particular, temperatures of from 50 to 180° C., preferably from 70 to 120° C., are set in these polymerization processes. The polymerization temperatures are generally in the range from −20 to 115° C., and the pressure is generally in the range from 1 to 100 bar. The solids content of the suspension is generally in the range from 10 to 80%. The polymerization can be carried out batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C.

The transition metal complexes used according to the invention and the catalyst systems in which they are present can also be produced by means of combinations of methods or their polymerization activity can be tested with the aid of these combined methods.

The process of the invention allows polymers of olefins to be prepared. The term "polymerization" as used here in the description of the invention encompasses both polymerization and oligomerization, i.e. oligomers and polymers having molar masses $M_w$, in the range from about 56 to 10 000 000 g/mol can be produced by this process.

The catalyst systems of the invention give a very high productivity in the polymerization of olefins, offer advantages in the metering of the catalyst system into the polymerization reactor and lead to significantly fewer problems in respect of catalyst residues in the polymer. The polymers prepared using the catalyst system of the present invention are particularly useful for applications which require a high product purity. In addition, the catalyst systems of the invention display a very good activity even at a relatively low molar ratio of aluminoxane to organic transition metal compound.

EXAMPLES

The following tests were carried out to characterize the samples:
Determination of the Specific Surface Area:
  By nitrogen adsorption in accordance with DIN 66131
Determination of the Pore Volume:
  By mercury porosimetry in accordance with DIN 66133
Determination of D10, D50 and D90:
  The particle size distribution of the particles were measured in a dispersion in isopropanol by laser light scattering using a Mastersizer X from Malvern, Great Britain. The sizes D10, D50 and D90 are the volume-based percentiles of the diameter. The D50 value is at the same time the median of the particle size distribution.
Determination of the Residual Moisture Content:
  The residual moisture content is the content of volatiles obtained from a measurement under an inert gas atmosphere using a Mettler LJ 16 Moisture Analyzer from Mettler-Toledo, Greifensee, Switzerland.
  The silica gel XPO-2107 used, a spray-dried silica gel from Grace, was baked at 600° C. for 6 hours. It had a pore volume of 1.5 ml/g, and a water content of less than 1% by weight.
  Bis(n-butylcyclopentadienyl)hafnium dichloride is commercially available from Crompton.
  2,6-Diacetylpyridinebis(2,4-dichloro-6-methylphenylanil)iron dichloride was prepared by the method of Qian et al., Organometallics 2003, 22, 4312-4321. Here, 65.6 g of 2,6-diacetylpyridine (0.4 mol), 170 g of 2,4-dichloro-6-methylaniline (0.483 mol), 32 g of silica gel type 135 and 160 g of molecular sieves (4 Å) were stirred in 1500 ml of toluene at 80° C. for 5 hours and a further 32 g of silica gel type 135 and 160 g of molecular sieves (4 Å) were subsequently added. The mixture was stirred at 80° C. for a further 8 hours, the insoluble solid was filtered off and washed twice with toluene. The solid was distilled off from the resulting filtrate, the residue was admixed with 200 ml of methanol and subsequently stirred at 55° C. for 1 hour. The suspension formed in this way was filtered and the solid obtained was washed with methanol and freed of the solvent. This gave 95 g of 2,6-diacetylpyridinebis(2,4-dichloro-6-methylphenylanil) in a yield of 47%. The reaction with iron(II) chloride was carried out as described by Qian et al., Organometallics 2003, 22, 4312-4321.

Example 1

A mixture of 234 mg (516 µmol) bis(n-butylcyclopentadienyl)hafniumdichloride and 13.5 ml MAO (4.6 M in toluene, 62.1 mmol) was stirred at 60° C. for 1 hour and subsequently added to 8.6 g of the pretreated support material while stirring. The mixture was stirred for a further 1 hour. The solid was dried under reduced pressure until it was free-flowing and the calculated residual moisture content of solvent was less than 5%. A second mixture of 31.3 mg (51.65 µmol) of 2,6-diacetylpyridinebis(2,4-dichloro-6-methylphenylanil) iron dichloride and 1.3 ml MAO (4.6 M in toluene, 5.98 mmol) in further 16 ml of toluene, which had been stirred at room temperature for 60 minutes beforehand, was added to the solid obtained in this way and the mixture was subsequently stirred at room temperature for a further one hour. The ratio of the total volume of the added solution to the pore volume of the support was 1.34. The solid was dried under reduced pressure until it was free-flowing and the calculated residual moisture content of solvent was less than 5%. ((Fe+Hf):Al=1:120). This gave 12.3 g of catalyst.

Comparative Example C1

A mixture of 32 mg (52.8 μmol) of 2,6-diacetylpyridinebis (2,4-dichloro-6-methylphenylanil)iron dichloride and 1.07 ml of MAO (4.75 M in toluene, 6.44 mmol) was stirred at room temperature for 1 hour and subsequently added to 8.6 g of the pretreated support material while stirring and the mixture was stirred at room temperature for a further one hour. The solid was dried under reduced pressure until it was free-flowing and the calculated residual moisture content of solvent was less than 5%. A mixture of 241.6 mg (532 μmol) of bis(n-butylcyclopentadienyl)hafnium dichloride and 14.6 ml of MAO (4.6 M in toluene, 67.16 mmol) in a further 17 ml of toluene, which had been stirred at room temperature for 60 minutes beforehand, was added to the solid obtained in this way and the mixture was subsequently stirred at room temperature for a further one hour. The ratio of the total volume of the added solution to the pore volume of the support was 0.85. The solid was dried under reduced pressure until it was free-flowing and the calculated residual moisture content of solvent was less than 5%. ((Fe+Hf):Al=1:120). This gave 12.8 g of catalyst.

Comparative Example C2

A mixture of 245.9 mg (500 μmol) bis(n-butylcyclopentadienyl)hafniumdichloride and 13 ml MAO (4.6 M in toluene, 59.8 mmol) was stirred at 60° C. for 1 hour and subsequently added to 8.6 g of the pretreated support material while stirring. The mixture was stirred for a further 1 hour. The solid was dried under reduced pressure until it was free-flowing and the calculated residual moisture content of solvent was less than 5%. A second mixture of 34.3 mg (51.65 μmol) of 2,6-diacetylpyridinebis(2,4-dichloro-6-methylphenylanil) iron dichloride and 1.44 ml MAO (4.6 M in toluene, 5.98 mmol) in further 15 ml of toluene, which had been stirred at 60° C. for 60 minutes beforehand, was added to the solid obtained in this way and the mixture was subsequently stirred at room temperature for a further one hour. The solid was dried under reduced pressure until it was free-flowing and the calculated residual moisture content of solvent was less than 5%. ((Fe+Hf):Al=1:120). This gave 12.3 g of catalyst.
Polymerization 2 ml of a triisobutylaluminum solution in heptane (corresponding to 75 mg of triisoprenylaluminum) were added to a 1 l autoclave which had been charged with an initial charge of 100 g of polyethylene and had been made inert by means of argon, and the amount of catalyst solid indicated in table 1 was finally introduced. Polymerization was carried out at an ethylene pressure of 10 bar (total pressure=19 bar) and 90° C. for 60 min. The polymerization was stopped by venting the autoclave and the product was discharged through the bottom valve. The data pertaining to the polymerizations are summarized in table 1. In the case of the polymerization using the catalyst from C1, polymer deposits were found in the metering apparatus after the polymerization was stopped.

TABLE 1

Polymerization results

| Catalyst from Ex. | Amount of cat. [mg] | Prod. [g/g of cat. h] |
|---|---|---|
| 1 | 101 | 564 |
| C1 | 108 | 322 |
| C2 | 105 | |

Abbreviation in the table:
Prod. Productivity in g of polymer obtained per g of catalyst used
Cat. Catalyst

The invention claimed is:

1. A process for preparing a catalyst system comprising the steps:
   A) activating a first catalyst component at a first temperature thereby producing a first active catalyst component;
   B) activating a second catalyst component at a second temperature which is at least 15° C. lower than the first temperature thereby producing a second active catalyst component;
   C) adding the first active catalyst component to a support component; and,
   D) adding the second active catalyst component to the support component thereby producing a catalyst system comprising at least a first active catalyst component and a second active catalyst component on a single support component.

2. The process according to claim 1, wherein step A), step B), step C) and step D are performed in an aprotic solvent.

3. The process according to claim 1 wherein after step C) and before step D) the support is dried in a drying step.

4. The process according to claim 1 wherein the step A) is performed at a temperature of 0 to 70° C. step B) is performed at a temperature of from −40° C. to 50° C.

5. The process according to claim 1 wherein the first active catalyst component is an early transition metal complex while the second active catalyst component is a late transition metal complex.

6. The process according to claim 5, wherein the early transition metal complex is a hafnocene or zirconocene and the late transition metal complex is an iron complex.

7. The process according to claim 1, wherein the support component used is a silica gel or calcined hydrotalcite.

8. A catalyst system obtained by a process according to claim 1.

9. A process for olefin polymerizations, carried out in the presence of a catalyst system according to claim 8.

10. The process of claim 9 for the (co)polymerization of ethylene, optionally with other olefin monomers.

* * * * *